E. H. BAILEY.

STAIR-PADS.

No. 7,411. Reissued Dec. 5, 1876.

*Witnesses*

C. M. Connell

Wm. R. Singleton

*Inventor.*

E. H. Bailey

Per Blanchard & Singleton Attys

UNITED STATES PATENT OFFICE.

EDWARD H. BAILEY, OF BROOKLYN, NEW YORK.

IMPROVEMENT IN STAIR-PADS.

Specification forming part of Letters Patent No. 119,105, dated September 19, 1871; reissue No. 7,411, dated December 5, 1876; application filed August 25, 1876.

*To all whom it may concern:*

Be it known that I, EDWARD H. BAILEY, of Brooklyn, in the county of Kings and State of New York, have invented certain new and useful Improvements in Stair-Pads; and I do hereby declare that the following is a full, clear, and exact description thereof, that will enable others skilled in the art to which it appertains to make and use the same, reference being had to the accompanying drawing, and to the letters of reference marked thereon, which form a part of this specification.

My invention consists in the means hereinafter fully described, and subsequently pointed out in the claims, for excluding moths and other noxious insects from carpets.

Figure 1:
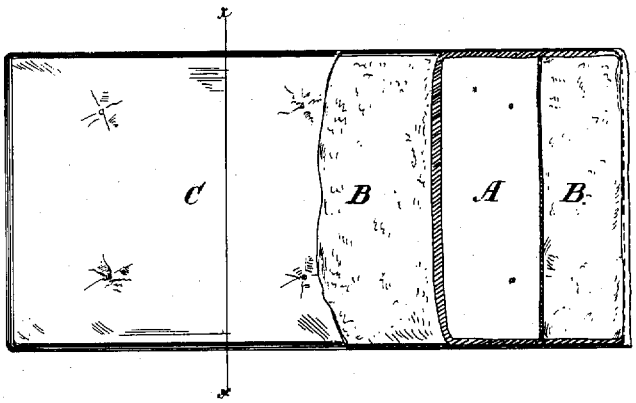
Figure 2:
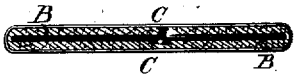

In the accompanying drawing, Figure 1 represents a top view of a stair-pad, with parts broken away to show the different layers or parts of which it is composed; but I wish it understood that I do not confine myself to this particular construction, as my invention is for the means of rendering a stair-pad moth and insect proof, and a protection to the carpet against moths and insects, without reference to the particular form of the structure. Fig. 2 is a cross-section of Fig. 1, taken on the line *x x*.

Similar letters indicate corresponding parts.

A is the central portion of the pad, formed of one or more layers or sheets of paper, which may be used when the essence of oil of sandal-wood, or essence of oil of cedar, is used; but such central portion may be omitted when, as in the present case, the material mainly relied upon for impregnating the pad is powdered wood. B represents cotton batting or wadding, by which the paper, when used, is surrounded. C is a body or outer case of cotton, linen, or other suitable cloth or material, the case being tightly sewed up or otherwise secured together at its edges, so as to inclose the batting. The paper A, when used, may be impregnated with the essence of oil of sandal-wood, or with the essence of oil of cedar; but for rendering not only the pad, but the carpet under which the pad is placed, moth and insect proof, I rely mainly upon powdered sandal or cedar wood, in combination with the batting or wadding, or in combination with any equivalent material used in the construction of the pad, the manner of its application being shown in Fig. 1 of the drawing. The odor of such wood will permeate the carpet and render it moth, worm, and insect proof.

I am aware that stair-pads have been used before; but I am not aware that powdered odoriferous woods have ever been used in combination with the fibrous material out of which the body of the pad is made, for the purpose of rendering both the pad and the carpet placed upon it moth and insect proof.

Having thus described my invention, what I claim, and desire to secure by Letters Patent, is—

1. In a stair-pad or carpet-lining, the combination of cotton batting or other suitable fibrous material, powdered sandal-wood or cedar, and a body or covering of cotton, linen, or other suitable cloth or material, whereby the pad is made moth and insect proof, substantially as described.

2. In a stair-pad or carpet-lining, the combination of the outer case C, inclosed batting B, and the intermediate paper A, impregnated with the odor of sandal-wood or of cedar, as set forth, to form a moth-excluding pad for stair or other carpets.

In testimony that I claim the foregoing I have hereunto set my hand this 17th day of August, 1876.

EDWARD HENRY BAILEY.

Witnesses:

JAMES FERGUS WARDHAUGH,
IRA TOMPKINS MOORE.